United States Patent
Bai et al.

(10) Patent No.: US 9,439,110 B2
(45) Date of Patent: Sep. 6, 2016

(54) METHOD AND SYSTEM FOR SPECTRUM HANDOVER IN COGNITIVE RADIO NETWORKS

(71) Applicant: CHINA ACADEMY OF TELECOMMUNICATIONS TECHNOLOGY, Beijing (CN)

(72) Inventors: Wenling Bai, Beijing (CN); Zhuo Gao, Beijing (CN); Chenggang Jiang, Beijing (CN); Yuanyuan Li, Beijing (CN); Yu Yang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/363,398

(22) PCT Filed: Sep. 28, 2012

(86) PCT No.: PCT/CN2012/082365
§ 371 (c)(1),
(2) Date: Jun. 6, 2014

(87) PCT Pub. No.: WO2013/082973
PCT Pub. Date: Jun. 13, 2013

(65) Prior Publication Data
US 2014/0323096 A1    Oct. 30, 2014

(30) Foreign Application Priority Data
Dec. 8, 2011    (CN) .......................... 2011 1 0405827

(51) Int. Cl.
*H04W 36/00*    (2009.01)
*H04W 16/14*    (2009.01)
(Continued)

(52) U.S. Cl.
CPC ......... *H04W 36/0072* (2013.01); *H04W 12/06* (2013.01); *H04W 16/14* (2013.01); *H04W 36/06* (2013.01)

(58) Field of Classification Search
CPC ... H04W 36/30; H04W 36/18; H04W 88/08; H04W 80/04
USPC .................. 455/439, 436, 561, 411; 370/331
See application file for complete search history.

(56) References Cited

U.S. PATENT DOCUMENTS

| | | | |
|---|---|---|---|
| 6,556,551 B1 * | 4/2003 | Schwartz | H04B 1/707 370/320 |
| 2005/0090276 A1 * | 4/2005 | Rajkotia | H04W 4/06 455/515 |

(Continued)

FOREIGN PATENT DOCUMENTS

| CN | 101702635 A | 5/2010 |
|---|---|---|
| CN | 102196452 A | 9/2011 |

(Continued)

OTHER PUBLICATIONS

Search Report in International Application No. PCT/CN2012/082365 dated Jan. 3, 2013.

(Continued)

*Primary Examiner* — Danh Le
(74) *Attorney, Agent, or Firm* — Marshall, Gerstein & Borun LLP

(57) ABSTRACT

Various examples provide a method and a system for spectrum handover in cognitive radio (CR) systems. According to the method, after detecting a user of an authorized system appears at a current working frequency, the base station generates a spectrum handover command and sends the spectrum handover command via a channel identified by the CR DWNDI to instruct the UEs in the cell to perform spectrum handover according to the spectrum handover command.

19 Claims, 6 Drawing Sheets

(51) Int. Cl.
  *H04W 36/06*  (2009.01)
  *H04W 12/06*  (2009.01)

(56)         References Cited

U.S. PATENT DOCUMENTS

| 2007/0142088 | A1* | 6/2007 | Boh et al. ............... 455/562.1 |
| 2009/0059868 | A1* | 3/2009 | Rajasimman ......... H04W 16/16 |
|              |     |        | 370/332 |
| 2009/0098871 | A1* | 4/2009 | Gogic ................. H04W 48/18 |
|              |     |        | 455/435.1 |
| 2009/0098873 | A1* | 4/2009 | Gogic ................. H04J 11/0069 |
|              |     |        | 455/436 |
| 2010/0056132 | A1* | 3/2010 | Gallagher ............... 455/422.1 |
| 2010/0136974 | A1  | 6/2010 | Kim et al. |
| 2010/0323704 | A1* | 12/2010 | Tailor ................. H04W 36/32 |
|              |     |        | 455/438 |
| 2011/0122840 | A1  | 5/2011 | Kim |
| 2012/0026971 | A1* | 2/2012 | Khandelia ........... H04W 36/005 |
|              |     |        | 370/331 |
| 2013/0070626 | A1* | 3/2013 | Gaal et al. ................. 370/252 |

FOREIGN PATENT DOCUMENTS

| CN | 102523612 A     | 6/2012 |
| WO | WO-03/094544 A1 | 11/2003 |
| WO | WO-2006/073225 A2 | 7/2006 |
| WO | WO-2007094604 A1 | 8/2007 |
| WO | WO-2008/042889 A1 | 4/2008 |

OTHER PUBLICATIONS

Office Action from Chinese Application No. 2011104058277 dated Nov. 21, 2013.
Search Report from European Application No. 12856138.8 dated Dec. 12, 2014.

* cited by examiner

METHOD AND SYSTEM FOR SPECTRUM HANDOVER IN COGNITIVE RADIO NETWORKS

The present disclosure is a national stage application of PCT/CN2012/082365 which claims the priority of Chinese patent application No. 201110405827.7 titled "method and apparatus for spectrum handover in cognitive radio networks" and filed on Dec. 8, 2011 with the Patent Office of the People's Republic of China, the disclosure of which is incorporated by reference in its entirety.

TECHNICAL FIELD

The present disclosure relates to communications, and particularly, to a method and a system for spectrum handover in cognitive radio (CR) networks.

BACKGROUND

Spectrum resources are becoming scarcer with the rapid developments in wireless communications. Research on spectrum for wireless communications has found that a certain frequency (e.g., a frequency allocated to television signals) may be idle in most of the time or not used in most regions and meanwhile there may be a lot of users from multiple systems contending for another frequency. That is, there is imbalance in the use of different spectrum resources. Cognitive Radio (CR) techniques are proposed to address the problem. According to CR techniques, changes in surrounding wireless environment are monitored and an available frequency channel of an authorized system is accessed dynamically and occasionally to perform communications as long as it will interfere with the authorized system.

A CR system can occasionally access an available frequency of an authorized system only on the precondition that traffic of the authorized system will not be impacted by the CR system. Thus, it is required that: (1) the CR system should have the ability of correctly detecting an available frequency channel of the authorized system; (2) the CR system should have the ability of performing spectrum handover, i.e., the CR system should quit using the current working frequency in time after detecting the authorized system appears on the current working frequency.

The spectrum handover is required to minimize its impact on communication signals of the authorized system, i.e., after detecting an authorized user appears, the CR system should quickly quit using the current working frequency (i.e., a working frequency) and select a new frequency (i.e., a target frequency) to establish a cell. Further, CR users should be quickly handed over to the newly established cell during the process to guarantee traffic continuity of the CR users. There are the following conventional mechanisms for spectrum handover.

FIG. 1 is a flowchart illustrating a spectrum handover process according to a first conventional mechanism. A base station of a CR system detects an authorized user appears at the current working frequency (i.e., the working frequency), sends a UE-Specific spectrum handover command to each user equipment (UE) that needs a handover within the cell (which is also referred to as a relevant UE). The UE receives the spectrum handover command and starts the spectrum handover process. After the handover, the base station stops transmission and reception at the working frequency, and recovers the cell at the target frequency.

FIG. 2 is a flowchart illustrating a spectrum handover process according to a second conventional mechanism. A base station of a CR system detects an authorized user appears at the current working frequency (i.e., the working frequency), informs UEs within the cell of an update in system information via a certain manner such as paging or the like. A UE receives the paging information, obtains a system information update notification. The base station of the CR system broadcasts updated system information (i.e., system broadcast information including a cell-common spectrum handover command). The UE receives the spectrum handover command, and starts the spectrum handover process. Then the base station stops transmission and reception at the working frequency, and recovers the cell at the target frequency.

SUMMARY

Various examples of the present disclosure provide a method and an apparatus for spectrum handover in CR systems to implement fast spectrum handover.

Various examples provide a method for spectrum handover in CR systems, including:

generating, by a base station, a spectrum handover command after detecting a user of an authorized system appears at a current working frequency;

sending, by the base station, the spectrum handover command via a channel identified by a CR dedicated wireless network device identity (DWNDI) to instruct UEs in a cell to perform spectrum handover according to the spectrum handover command.

Various examples also provide an apparatus for spectrum handover in CR systems, including:

receiving, by a UE, a spectrum handover command sent by a base station from a channel identified by a CR dedicated wireless network device identity (DWNDI);

performing, by the UE, spectrum handover according to the spectrum handover command.

Various examples of the present disclosure still provide a CR system which includes a base station and a UE, the base station including:

a determining module, configured to generate a spectrum handover command after detecting a user of an authorized system appears at a current working frequency;

a sending module, configured to send the spectrum handover command via a channel identified by a CR dedicated wireless network device identity (DWNDI) to instruct UEs in a cell to perform spectrum handover according to the spectrum handover command.

The technical mechanism of examples has at least the following merits compared to conventional mechanisms: fast and accurate spectrum handover, reduced transmission delay of spectrum handover commands, no interference to users of authorized systems. Therefore, the technical mechanism of various examples can protect service quality of authorized systems while satisfying requirements of users of the CR system for service continuity.

DETAILED DESCRIPTION

During the process of conceiving the mechanism of the present disclosure, the inventor found the conventional mechanisms have at least the following drawbacks.

According to the first mechanism, all UEs that are in the RRC-connected status within the cell are required to be handed over to the target frequency during the spectrum handover. Since there are generally a large number of UEs (e.g., more than 1200) within a cell that are in the RRC-connected status, the spectrum handover command needs to be sent to the UEs one by one. The large number of spectrum handover commands generates a long transmission delay, thus the spectrum handover process is time-consuming.

According to the second mechanism, the base station first needs to inform UEs in the cell of the system information update via paging or other manners, and then broadcasts system broadcast information including cell-common spectrum handover command. The process results in a long transmission delay of the spectrum handover command, thus the spectrum handover process is also time-consuming.

Thus, the above first and second mechanisms both have a time-consuming spectrum handover process. As such, the CR system cannot protect authorized users from interference, and cannot satisfy traffic continuity requirements of users in the CR systems.

Example One

This example provides a method for spectrum handover in CR systems. The method is applicable to various mobile communications systems if the CR technique is supported, e.g., a Long Term Evolution (LTE) system, a Time Division-Synchronous Code Division Multiple Access (TD-SCDMA) system, a High-Speed Packet Access (HSPA) system, a Code Division Multiple Access (CDMA)-2000 system, a Wideband Code Division Multiple Access (WCDMA) system, a Global System for Mobile communications (GSM) system.

Figure 1:
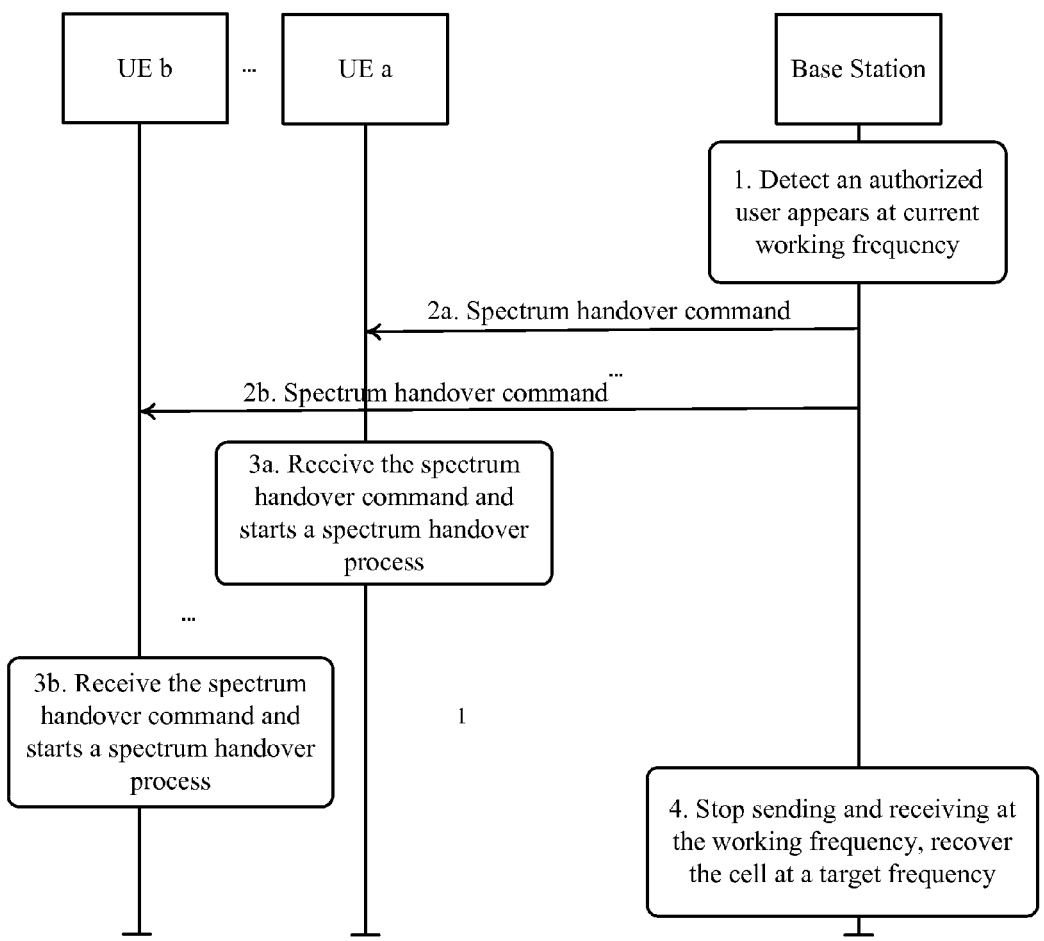
FIG. 1 and FIG. 2 are flowcharts illustrating conventional mechanisms for spectrum handover.
Figure 2:
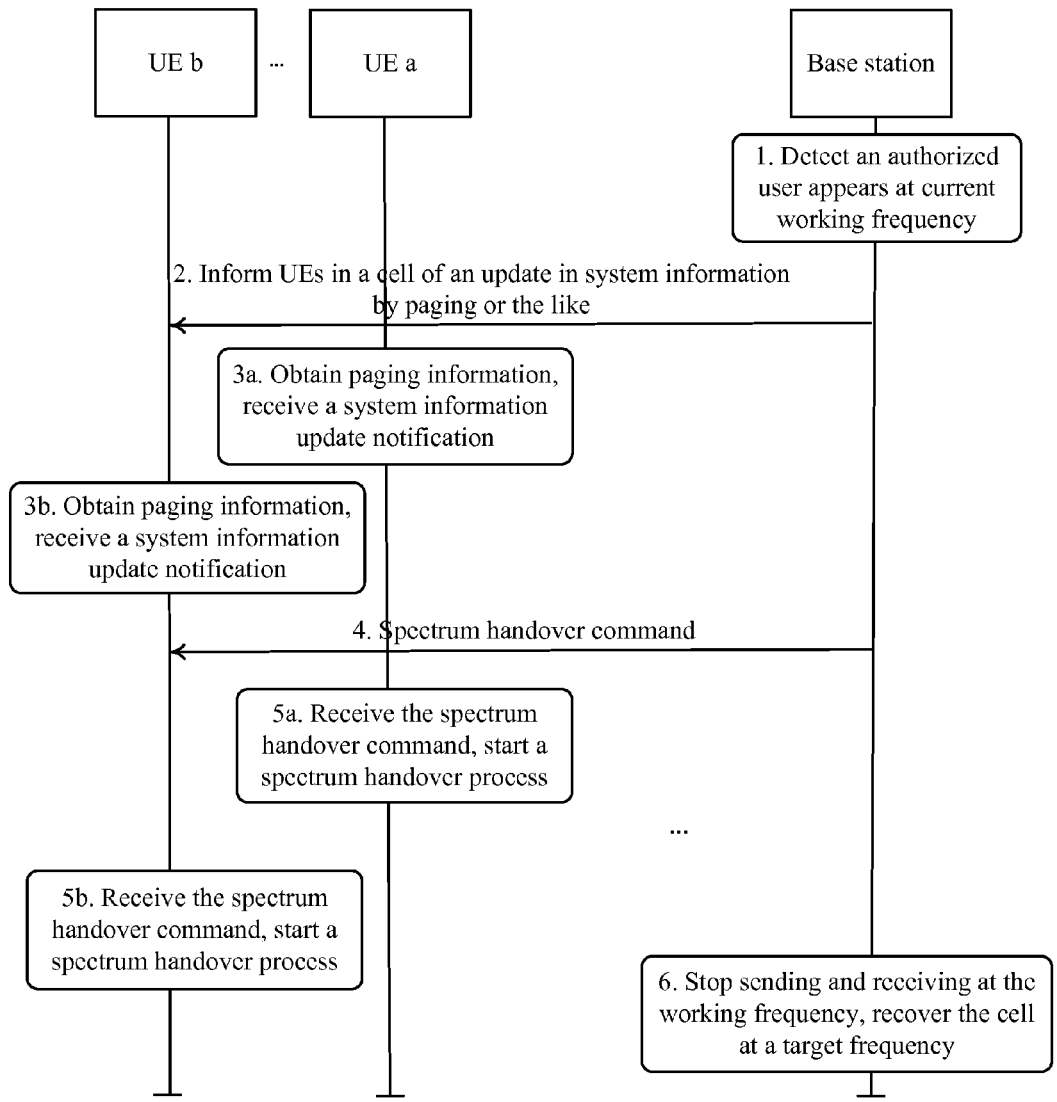
Figure 3:
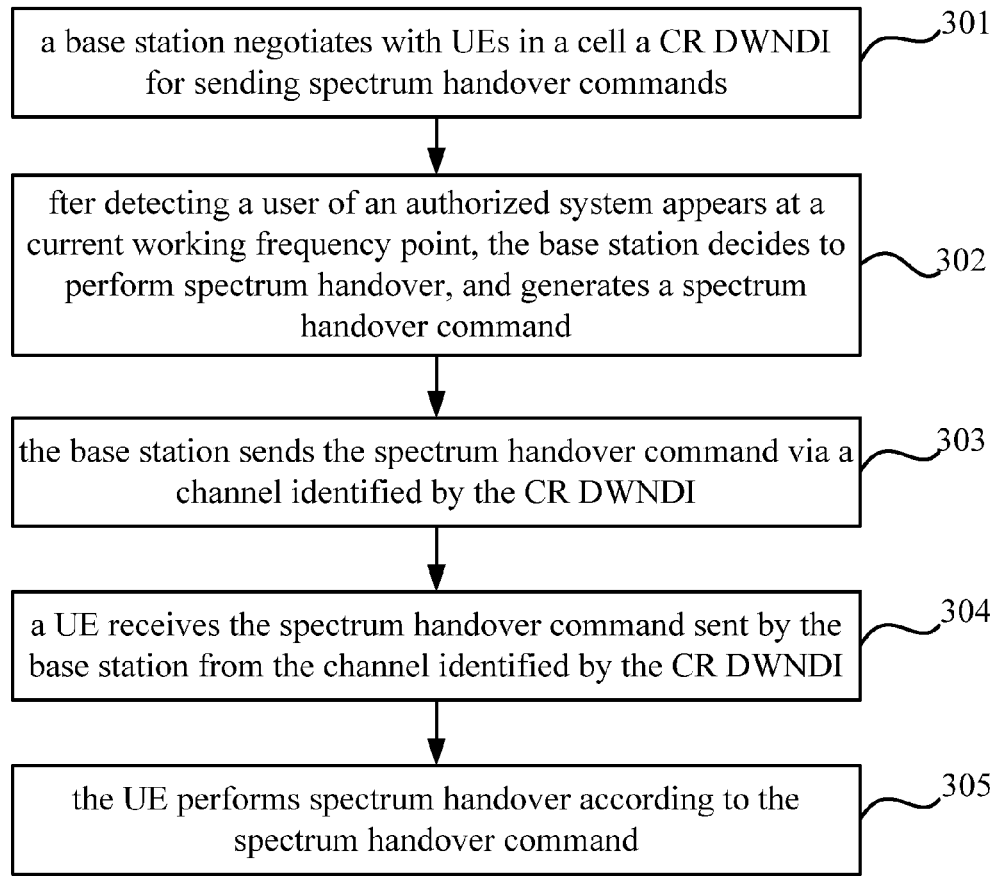
FIG. 3 is a flowchart illustrating a method for spectrum handover in CR systems in accordance with a first example of the present disclosure.

As shown in FIG. 3, the method for spectrum handover in CR systems may include the following procedures.

At block 301, a base station (which is a base station of a CR system) negotiates a CR dedicated wireless network device identity (simply referred to as CR DWNDI) for transmitting spectrum handover commands with a UE (which is a CR-based UE in the CR system) in a cell.

In an example, the base station may negotiate the CR DWNDI with UEs in the cell by using the following manners. The following methods are merely examples, and other methods may be used in other examples.

According to a first method, the CR DWNDI is statically defined in a protocol. For example, a certain wireless network device identity that is reserved but has not been defined in the CR system may be statically defined in a protocol as the CR DWNDI for UEs in the cell.

According to a second method, the CR DWNDI may be dynamically configured as system information. For example, a base station may choose one of wireless network device identities that are not reserved and have not been allocated to a UE as the CR DWNDI for UEs in the cell, and broadcast the CR DWNDI to UEs in the cell as system information. A UE may receive the CR DWNDI broadcasted by the base station as system information to UEs in the cell.

According to a third method, the CR DWNDI may be dynamically configured via UE-specific signaling. For example, a base station may choose one of wireless network device identities that are not reserved and have not been allocated to a UE as the CR DWNDI for UEs in the cell, and send the CR DWNDI to UEs in the cell via UE-specific signaling. A UE may receive the CR DWNDI sent by the base station via the UE-specific signaling.

At block 302, the base station detects a user of an authorized system appears at the current working frequency (i.e., the working frequency which is the current working available frequency), decides to perform spectrum handover, generates a spectrum handover command. The spectrum handover command includes at least a target frequency and configuration information of wireless resources.

At block 303, the base station sends the spectrum handover command via a channel identified by a CR DWNDI to instruct UEs in a cell to perform spectrum handover according to the spectrum handover command.

In an example, the base station may also determine a repeat number of sending the spectrum handover command when generating the spectrum handover command. When sending the spectrum handover command, the base station may send the spectrum handover command for a number of times according to the repeat number via the channel. For example, when the repeat number is 3, the base station may send the spectrum handover command for 3 times via the channel identified by the CR DWNDI.

At block 304, a UE receives the spectrum handover command sent by the base station from a channel identified by the CR DWNDI.

In an example, the UE may check whether a channel in each downlink sub frame is identified by the CR DWNDI. If the channel is identified by the CR DWNDI, the UE receives the spectrum handover command from the base station (i.e., the UE obtains the spectrum handover command according to information after determining the channel is identified by the CR DWNDI, and starts the procedure 305 of performing spectrum handover according to the spectrum handover command). If the channel is not identified by the CR DWNDI, the UE continues the procedure of checking whether a channel is identified by the CR DWNDI.

The UE may be one of UEs in the cell that are configured with the CR DWNDI.

At block 305, the UE performs spectrum handover according to the spectrum handover command. The UE may perform the spectrum handover according to information in the spectrum handover command, e.g., the target frequency and configurations of wireless resources and the like.

In an example, the base station may stop sending and receiving data at the working frequency after sending the spectrum handover command via the channel identified by the CR DWNDI, and recovers the cell at the target frequency. This procedure may be performed after the procedure at block 303, and is not described further here.

In an example, the channel identified by the CR DWNDI may be a conventional channel or a newly-defined channel.

The information may include, but not limited to, a physical layer control channel, or a physical layer data channel scheduled by the physical layer control channel.

The following are examples of the mechanism applied to an LTE system. In an LTE system, a Physical Downlink Control Channel (PDCCH) is for transporting Downlink Control Information (DCI) which includes uplink schedule information, downlink schedule information and uplink power control information and the like. In an example, the PDCCH may be shared by multiple users, and a UE may search within the whole control region for a control signaling message according to a certain rule. The DCI information of the PDCCH is scrambled to be a 16-bit Cyclical Redundancy Check (CRC) by using a radio network temporary identifier (RNTI) to inexplicitly identify the target UE of the DCI.

Currently, a total of eleven DCI formats are defined for LTE systems, i.e., DCI 0, DCI 1, DCI 1A, DCI 1B, DCI 1C, DCI 1D, DCI 2, DCI 2A, DCI 2B, DCI 3 and DCI 3A. The RNTI includes common RNTI and dedicated RNTI. As shown in Table 1, SI-RNIT, P-RNTI, M-RNTI and RA-RNTI are cell-common RNTIs, and are used for scheduling and transmitting system information and common information. DCI formats that are addressable include DCI 1A and DCI 1C. The search space is located in a common search space. The RNTI of FFF4-FFFC is reserved in the LTE system for future use.

TABLE 1

| Value (hexa-decimal) | RNTI (radio network temporary identifier) |
|---|---|
| 0000 | N/A |
| 0001-003C | RA (random access)-RNTI, C-RNTI (cell RNTI), Semi-Persistent Scheduling C-RNTI, Temporary C-RNTI, TPC (transmit power control)-PUCCH (Physical Uplink Control Channel)-RNTI and TPC-PUSCH (Physical Uplink Shared Channel)-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M (Multimedia Broadcast Multicast Service)-RNTI |
| FFFE | P (Paging)-RNTI |
| FFFF | SI (System Information)-RNTI |

Based on the above analysis, the CR DWNDI in an LTE system in an example may include, but not limited to, CR-RNTI. The method of the base station negotiates the CR-RNTI for transmitting the spectrum handover command may include, but not limited to, the following methods.

According to a first method, the CR-RNTI is statically defined in a protocol. In an example, an RNTI which is reserved but has not been defined in the LTE system may be designated as the CR-RNTI of the cell. For example, one of FFF4-FFFC (as shown in Table 1) which is reserved but not defined, e.g., FFFC, may be designated as the CR-RNTI.

According to a second method, the CR-RNTI may be dynamically configured by using system information. In an example, a base station of the LTE system selects one of RNTIs which are unreserved and have not been allocated to a UE as the CR-RNTI, and broadcasts the CR-RNTI to all UEs in the cell. The UEs obtain the CR-RNTI of the cell by receiving system broadcast information.

According to a third method, the CR-RNTI may be dynamically configured using UE-specific signaling. In an example, the base station may select one of RNTIs which are unreserved and have not been allocated to a UE as the CR-RNTI, and sends the CR-RNTI to relevant UEs in the cell via UE-specific signaling (e.g., RRC connection establish messages, RRC connection re-establish messages, RRC re-configuration messages and the like).

In an example, the channel addressable by a CR DWNDI in an LTE system may include, but not limited to: a PDCCH, i.e., the channel identified by the CR-RNTI may be a PDCCH. The procedure of the base station sending the spectrum handover command via the channel identified by the CR DWNDI may include: the base station sends or schedules the spectrum handover command by using PDCCH DCI which is in the common search space and is identified by the CR-RNTI. The procedure of sending the spectrum handover command refers to directly sending the spectrum handover command in the PDCCH DCI. The procedure of scheduling the spectrum handover command refers to using the PDCCH DCI to specify information of the PDSCH that transports the spectrum handover command, e.g., the time/frequency resources and transmission format and the like.

In an example, the PDCCH DCI may include, but not limited to, existing PDCCH DCI for scheduling system common information in LTE systems, e.g., DCI 1A, DCI 1C or the like, or newly-defined PDCCH DCI formats dedicated to scheduling or transporting the spectrum handover command.

According to various examples, after negotiating with UEs a CR DWNDI for transporting spectrum handover commands, a base station of a CR system may transmit a spectrum handover command via a channel identified by the CR DWNDI to instruct all of UEs in the cell to perform spectrum handover when detecting a user from an authorized system appears at the current working frequency. A UE configured with the CR DWNDI in the cell may check whether a channel in each downlink sub frame is identified by the CR DWNDI, receive the spectrum handover command according to indication information when detecting a channel identified by the CR DWNDI, and start performing spectrum handover. The technical mechanism can implement fast and accurate spectrum handover with reduced transmission delay of spectrum handover commands, and generate no interference to users of authorized systems. Therefore, the technical mechanism of various examples can protect service quality of authorized systems while satisfying requirements of users of the CR system for service continuity.

Example Two

Figure 4:
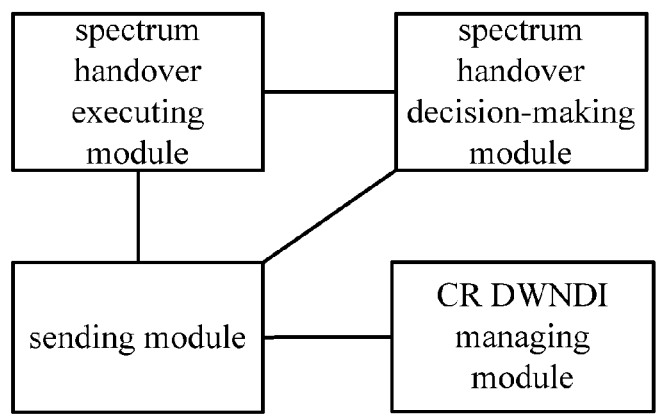
FIG. 4 is a schematic diagram illustrating modules of a base station in accordance with a second example of the present disclosure.
Figure 5:
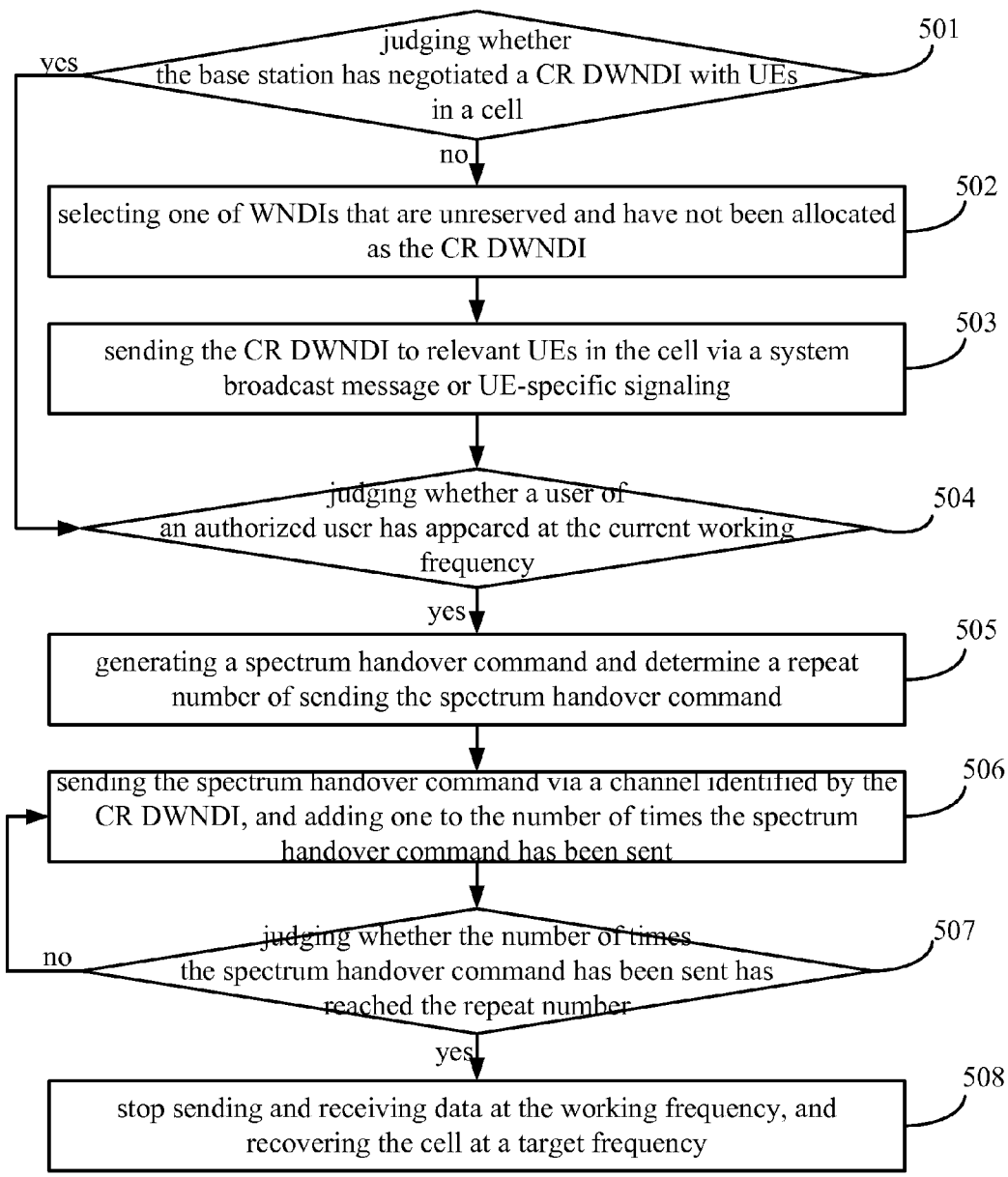
FIG. 5 is a flowchart illustrating a method for spectrum handover in CR systems in accordance with a second example of the present disclosure.

The method for spectrum handover in CR systems according to this example is described by taking a processing flow of a base station in a CR system as an example. The base station may include modules as shown in FIG. 4, i.e., a spectrum handover executing module, a spectrum handover decision-making module, a CR DWNDI managing module and a sending module. Based on the modules, the method for spectrum handover in CR systems may include the following procedures as shown in FIG. 5.

At block 501, the CR DWNDI managing module judges whether the base station has negotiated a CR DWNDI with UEs in a cell, the procedure in block 504 is performed if the base station has negotiated the CR DWNDI with the UEs in the cell, and the procedure in block 502 is performed if the base station has not negotiated the CR DWNDI with the UEs in the cell.

At block 502, the CR DWNDI module selects a wireless network device identity (WNDI) from WNDIs that are unreserved and have not been allocated to a UE as the CR DWNDI.

At block 503, the sending module sends the CR DWNDI to relevant UEs in the cell via system broadcast messages or via UE-specific signaling.

At block 504, the spectrum handover decision-making module judges whether a user of an authorized system has appeared at the current working frequency (i.e., judging whether spectrum handover is necessary), the procedure in block 505 is performed if the user of the authorized system has appeared, and the procedure in block 504 is performed again if the user of the authorized system has not appeared.

At block 505, the spectrum handover decision-making module generates a spectrum handover command and specifies a repeat number of sending the spectrum handover command. The spectrum handover command may include at least a target frequency and configuration information of wireless resources.

At block 506, the sending module sends the spectrum handover command via a channel identified by the CR DWNDI, and adds one to the number of times the spectrum handover command has been sent.

At block 507, the sending module judges whether the number of times the spectrum handover command has been sent has reached the specified repeat number, sets the number of times the spectrum handover command has been sent to be zero and performs the procedure in block 508 if the number of times has reached the specified repeat number, or performs the procedure at block 506 if the number of times has not reached the specified repeat time.

At block 508, the spectrum handover executing module makes the base station stop sending and receiving data at the working frequency, and recovers the cell at the target frequency.

In various examples, the base station may be a cell managing device such as an LTE base station adopting CR techniques, a Radio Network Controller (RNC) in a 3G or 2G system, or the like.

Example Three

Figure 6:
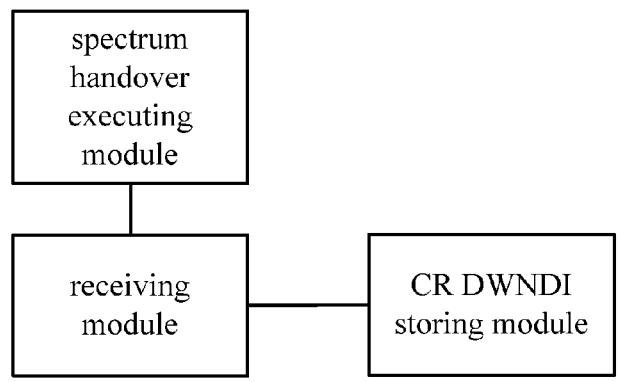
FIG. 6 is a schematic diagram illustrating modules of a UE in accordance with a third example of the present disclosure.
Figure 7:
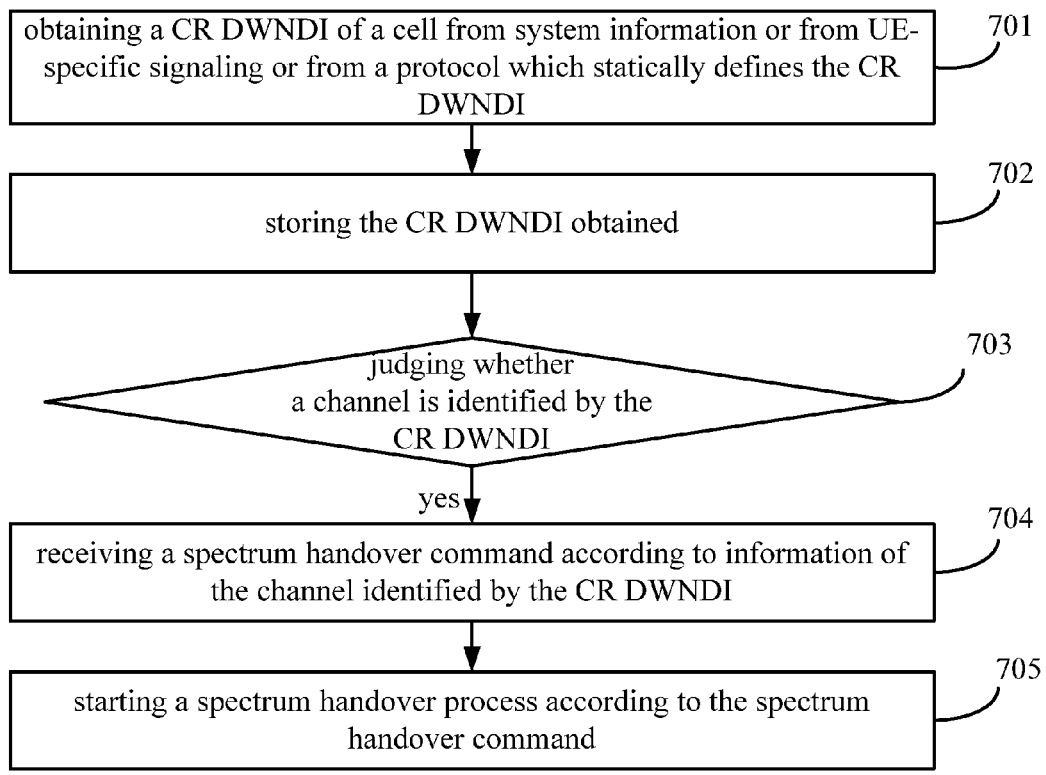
FIG. 7 is a flowchart illustrating a method for spectrum handover in CR systems in accordance with a third example of the present disclosure.

The method for spectrum handover in CR systems according to this example is described by taking a processing flow of a UE in a CR system as an example. The UE may include modules as shown in FIG. 6, i.e., a spectrum handover executing module, a receiving module, and a CR DWNDI storing module. Based on the modules, the method for spectrum handover in CR systems may include the following procedures as shown in FIG. 7.

At block 701, the receiving module obtains a CR DWNDI of a cell from system information or from UE-specified signaling or from a protocol which statically defines the CR DWNDI.

At block 702, the CR DWNDI storing module stores the CR DWNDI. If the CR DWNDI has been stored previously, the stored CR DWNDI is updated with the CR DWNDI obtained at block 701.

At block 703, the receiving module receives a downlink sub frame, judges whether a channel in the downlink sub frame is identified by the CR DWNDI, the procedure in block 704 is performed if the channel is identified by the CR DWNDI, and the procedure in block 703 is performed again if the channel is not identified by the CR DWNDI.

At block 704, the receiving module receives a spectrum handover command using information of the channel identified by the CR DWNDI.

At block 705, the spectrum handover executing module starts spectrum handover according to the spectrum handover command, i.e., performing spectrum handover according to the target frequency and the configuration information of wireless resources.

According to various examples, the UE may be a UE adopting CR techniques in a mobile communication system such as an LTE system, a TD-SCDMA system, an HSPA system, a CDMA-2000 system, a WCDMA system, a GSM system and the like.

Example Four

Figure 8:
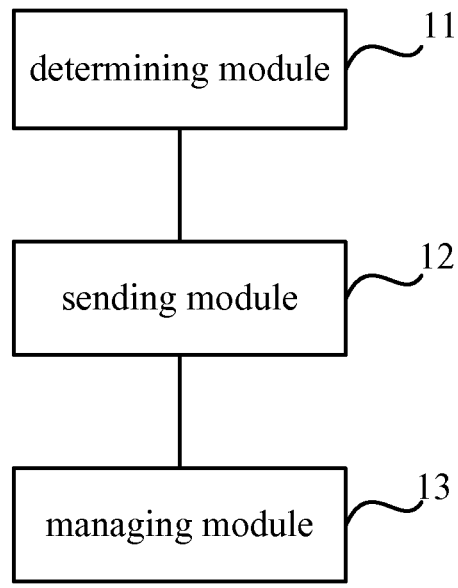
FIG. 8 is a schematic diagram illustrating modules of a base station according to a fourth example of the present disclosure.

Various examples also provide a base station based on the same principle. As shown in FIG. 8, the base station may include the following modules.

A determining module 11 may generate a spectrum handover command after it is detected that a user of an authorized system appears at a current working frequency.

A sending module 12 may send the spectrum handover command via a channel identified by a CR DWNDI to instruct UEs in a cell to perform spectrum handover according to the spectrum handover command.

In an example, the determining module 11 may also determine a repeat number of sending the spectrum handover command. The sending module 12 may send the spectrum handover command via the channel according to the repeat number.

In an example, the base station may also include: a managing module 13. The managing module 13 may negotiate with UEs in the cell the CR DWNDI for sending the spectrum handover command.

The managing module 13 may negotiate with the UEs in the cell the CR DWNDI by using one of the following:

statically defining one of wireless network device identities (WNDI) that are reserved but have not been defined in the CR system as the CR DWNDI for UEs in the cell;

selecting one of WNDIs that are unreserved and have not been allocated to a UE as the CR DWNDI for UEs in the cell, and broadcasting the CR DWNDI to UEs in the cell as system information; and selecting one of WNDIs that are unreserved and have not been allocated to a UE as the CR DWNDI for UEs in the cell, and sending the CR DWNDI to UEs in the cell via UE-specific signaling.

In an example, the CR DWNDI may include a CR-RNTI in an LTE system.

In an example, the channel identified by the CR DWNDI may include: a physical layer control channel, or a physical layer data channel scheduled by a physical layer control channel.

In an example, the channel identified by the CR DWNDI may include: a PDCCH in an LTE system. The sending module 12 may send or schedule the spectrum handover command by using a PDCCH DCI which is in a common search space and is identified by a CR-RNTI.

The modules of an apparatus according to various examples may be embodied by one entity or may be distributed. The modules may be integrated into one module, or may be divided further into multiple sub modules.

Example Five

Figure 9:
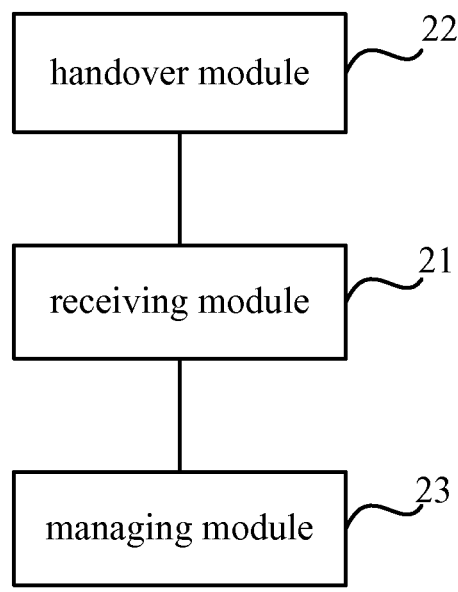
FIG. 9 is a schematic diagram illustrating modules of a UE according to a fifth example of the present disclosure.

Various examples also provide a UE based on the same principle. As shown in FIG. 9, the UE may include the following modules.

A receiving module 21 may receive a spectrum handover command sent by a base station from a channel identified by a CR DWNDI.

A handover module 22 may perform spectrum handover according to the spectrum handover command.

The receiving module 21 may check whether a channel in each downlink sub frame is identified by the CR DWNDI, and receive the spectrum handover command if a channel is identified by the CR DWNDI.

In an example, the UE may also include: a managing module 23. The managing module 23 may negotiate with the base station the CR DWNDI for sending the spectrum handover command.

The managing module 23 may negotiate with the base station the CR DWNDI by using one of the following:

statically defining one of wireless network device identities that are reserved but have not been defined in the CR system as the CR DWNDI for UEs in the cell;

receiving, by the UE, the CR DWNDI broadcasted by the base station as system information to UEs in the cell after the base station selects one of WNDIs that are unreserved and have not been allocated to a UE as the CR DWNDI for UEs in the cell, and; and receiving, by the UE, the CR DWNDI sent by the base station via UE-specific signaling after the base station selects one of WNDIs that are unreserved and have not been allocated to a UE as the CR DWNDI for UEs in the cell.

In an example, the CR DWNDI may include a CR-RNTI in an LTE system.

In an example, the channel identified by the CR DWNDI may include: a physical layer control channel, or a physical layer data channel scheduled by a physical layer control channel.

In an example, the channel identified by the CR DWNDI in an LTE system may include: a PDCCH. The receiving module 21 may receive the spectrum handover command from a PDCCH DCI which is in a common search space and is identified by a CR-RNTI.

The modules of an apparatus according to various examples may be embodied by one entity or may be distributed. The modules may be integrated into one module, or may be divided further into multiple sub modules.

Through the above description, those skilled in the art may understand that the examples of the present disclosure may be implemented by hardware or by a general-purpose hardware platform together with software. Thus, the technical scheme, or the portions making contributions to the conventional art may be embodied by a software product. The software product may be stored in a non-transitory storage medium, may include instructions to cause a computing machine (e.g., a PC, a server or a network device and the like) to execute the method of the various examples of the present disclosure.

Those skilled in the art should understand each of the drawings is merely a schematic of a preferred example, and all the modules and the procedures in the drawings are not necessary for implementing the present disclosure.

Those skilled in the art can understand the modules in the apparatus of examples of the present disclosure may be located in the apparatus as described in the examples, or may be located in one or more apparatuses of the examples of the present disclosure when modified accordingly. The modules in examples of the present disclosure may be combined into one module, or may be further divided into multiple sub modules.

The index numbers of the examples are merely for facilitating description, and should not be interpreted to be representative for the preference order of the examples.

The foregoing is only some examples of the present disclosure. The protection scope of the present disclosure, however, is not limited to the above description. A change or substitution that is within the scope disclosed by the present disclosure and can easily occur to those skilled in the art should be covered by the protection scope of the present disclosure.

The invention claimed is:

1. A method for spectrum handover in cognitive radio (CR) systems, the method comprising:
    configuring a CR dedicated wireless network device identity (DWNDI) of a user equipment (UE) to be a CR DWNDI value shared by plural UEs within a cell of a base station which communicates with the plural UEs at a working frequency;
    instructing, by the base station, the plural UEs to perform spectrum handover to a target frequency using a spectrum handover command which is sent via a channel identified by the CR DWNDI value and received by the plural UEs according to the CR DWNDI value after the base station detects that a user of an authorized system appears at the working frequency; and
    communicating, by the base station, with the plural UEs at the target frequency after the spectrum handover.

2. The method of claim 1, wherein instructing by the base station the plural UEs to perform spectrum handover using the spectrum handover command comprises:
    determining, by the base station, a repeat number of sending the spectrum handover command, and sending the spectrum handover command according to the repeat number via the channel.

3. The method of claim 1, further comprising:
    negotiating, by the base station with the UEs in the cell, the CR DWNDI value for sending the spectrum handover command before sending the spectrum handover command via a channel identified by the CR DWNDI value.

4. The method of claim 3, wherein the negotiating by the base station with the UEs in the cell the CR DWNDI value comprises one of:
    statically defining one of wireless network device identities that are reserved but have not been defined in a CR system as the CR DWNDI value for UEs in the cell;
    selecting, by the base station, one of WNDIs that are unreserved and have not been allocated to a UE as the CR DWNDI value for UEs in the cell, and broadcasting the CR DWNDI to UEs in the cell as system information; and
    selecting, by the base station, one of WNDIs that are unreserved and have not been allocated to a UE as the CR DWNDI value for UEs in the cell, and sending the CR DWNDI value to UEs in the cell via UE-specific signaling.

5. The method of claim 1, the CR DWNDI comprises: a CR-radio network temporary identity (RNTI) in a long-term evolution (LTE) system.

6. The method of claim 1, wherein the channel identified by the CR DWNDI value comprises:
    a physical layer control channel; or
    a physical layer data channel scheduled by the physical layer control channel.

7. The method of claim 6, wherein the channel identified by the CR DWNDI value comprises: a physical downlink control channel (PDCCH) in an LTE system;

wherein the sending by the base station the spectrum handover command via a channel identified by the CR DWNDI value comprises:
sending or scheduling, by the base station, the spectrum handover command by using a PDCCH DCI which is in a common search space and is identified by a CR-RNTI value.

8. A method for spectrum handover in cognitive radio (CR) systems, the method comprising:
receiving, by a user equipment (UE), a CR dedicated wireless network device identity (DWNDI) value from a base station as a CR DWNDI of the UE, the CR DWNDI value is shared by plural UEs within a cell of the base station which communicates with the plural UEs at a working frequency;
receiving, by the UE, a spectrum handover command sent by a base station from a channel identified by the CR DWNDI value;
performing, by the UE, spectrum handover to a target frequency according to the spectrum handover command; and
communicating, by the UE, with the base station at the target frequency after the spectrum handover.

9. The method of claim 8, wherein the receiving by the UE the spectrum handover command sent by the base station from a channel identified by the CR DWNDI value comprises:
checking whether a channel in each downlink sub frame is identified by the CR DWNDI value, and receiving the spectrum handover command if a channel is identified by the CR DWNDI value.

10. The method of claim 8, further comprising:
negotiating, by the UE with the base station, the CR DWNDI value for sending the spectrum handover command before receiving the spectrum handover command sent by the base station from a channel identified by the CR DWNDI value.

11. The method of claim 10, wherein the negotiating by the UE with the base station the CR DWNDI value comprises one of:
defining one of wireless network device identities that are reserved but have not been defined in a CR system as the CR DWNDI value for UEs in the cell;
receiving, by the UE, the CR DWNDI value broadcasted by the base station as system information to UEs in the cell after the base station selects one of WNDIs that are unreserved and have not been allocated to a UE as the CR DWNDI value for UEs in the cell; and
receiving, by the UE, the CR DWNDI value sent by the base station via UE-specific signaling after the base station selects one of WNDIs that are unreserved and have not been allocated to a UE as the CR DWNDI value for UEs in the cell.

12. A cognitive radio (CR) system, comprising a base station and a user equipment (UE), wherein the base station comprises:
a managing module, configured to configure a CR dedicated wireless network device identity (DWNDI) of a user equipment (UE) to be a CR DWNDI value shared by plural UEs within a cell of the base station which communicates with the plural UEs at a working frequency;
a determining module, configured to generate a spectrum handover command after detecting a user of an authorized system appears at the working frequency; and
a sending module configured to instruct the plural UEs to perform spectrum handover to a target frequency by sending the spectrum handover command via a channel identified by DWNDI value to communicate with the plural UEs at the target frequency.

13. The CR system of claim 12, wherein
the determining module is further configured to determine a repeat number of sending the spectrum handover command; and
the sending module is configured to send the spectrum handover command according to the repeat number via the channel identified by the CR DWNDI value.

14. The CR system of claim 12, wherein the managing module is configured to negotiate with the UEs in the cell the CR DWNDI value for sending the spectrum handover command.

15. The CR system of claim 14, wherein
the managing module is configured to negotiate with the UEs in the cell the CR DWNDI value by using one of:
defining one of wireless network device identities that are reserved but have not been defined in a CR system as the CR DWNDI value for UEs in the cell;
selecting one of WNDIs that are unreserved and have not been allocated to a UE as the CR DWNDI value for UEs in the cell, and broadcasting the CR DWNDI value to UEs in the cell as system information; and
selecting one of WNDIs that are unreserved and have not been allocated to a UE as the CR DWNDI value for UEs in the cell, and sending the CR DWNDI value to UEs in the cell via UE-specific signaling.

16. The CR system of claim 12, wherein the UE comprises:
a receiving module, configured to receive a CR dedicated wireless network device identity (DWNDI) value, which is shared by plural UEs within a cell, from the base station as a CR DWNDI of the UE, and receive a spectrum handover command sent by a base station from a channel identified by the CR DWNDI value; and
a handover module, configured to perform spectrum handover according to the spectrum handover command.

17. The CR system of claim 16, wherein
the receiving module is configured to check whether a channel in each downlink sub frame is identified by the CR DWNDI value, and receive the spectrum handover command if a channel is identified by the CR DWNDI value.

18. The CR system of claim 16, further comprising:
a managing module configured to negotiate with the base station the CR DWNDI value for sending the spectrum handover command.

19. The CR system of claim 18, wherein
the managing module is configured to negotiate with the base station the CR DWNDI value by using one of:
defining one of wireless network device identities that are reserved but have not been defined in a CR system as the CR DWNDI value for UEs in the cell;
receiving, by the UE, the CR DWNDI value broadcasted by the base station as system information to UEs in the cell after the base station selects one of WNDIs that are unreserved and have not been allocated to a UE as the CR DWNDI value for UEs in the cell; and
receiving, by the UE, the CR DWNDI value sent by the base station via UE-specific signaling after the base station selects one of WNDIs that are unreserved and have not been allocated to a UE as the CR DWNDI value for UEs in the cell.

* * * * *